United States Patent [19]

Danielsson et al.

[11] Patent Number: 4,822,220

[45] Date of Patent: Apr. 18, 1989

[54] DEVICE FOR SECURING TOOLS IN METAL WORKING MACHINE

[76] Inventors: Sven-Arne Danielsson; Agneta Danielsson, both of Flattinge, S-340 15 Vittaryd, Sweden

[21] Appl. No.: 14,066
[22] PCT Filed: May 19, 1986
[86] PCT No.: PCT/SE86/00234
§ 371 Date: Jan. 16, 1987
§ 102(e) Date: Jan. 16, 1987
[87] PCT Pub. No.: WO86/06992
PCT Pub. Date: Dec. 4, 1986

[30] Foreign Application Priority Data

May 20, 1985 [SE] Sweden ................ 8502465

[51] Int. Cl.$^4$ .................... B23C 5/26; B23B 31/06
[52] U.S. Cl. .................... 409/233; 408/239 R
[58] Field of Search ........... 409/231, 232, 233, 234; 408/238, 239 R, 239 A, 156

[56] References Cited

U.S. PATENT DOCUMENTS

| | | |
|---|---|---|
| 3,136,217 | 6/1964 | Swanson et al. ............ 409/233 |
| 3,269,271 | 8/1966 | Bruckner ..................... 409/233 |
| 3,895,881 | 7/1975 | Langlois ...................... 408/156 |

FOREIGN PATENT DOCUMENTS

| | | |
|---|---|---|
| 0123918 | 11/1984 | European Pat. Off. ........... 409/233 |
| 2100860 | 7/1972 | Fed. Rep. of Germany ....... 409/234 |
| 16976 | 2/1978 | Japan ............................. 409/233 |
| 24944 | 2/1984 | Japan ............................. 409/233 |
| 16329 | 1/1985 | Japan ............................. 409/233 |
| 332746 | 2/1971 | Sweden .......................... 409/233 |
| 1207652 | 1/1986 | U.S.S.R. ......................... 409/233 |

Primary Examiner—William Briggs
Attorney, Agent, or Firm—Howson and Howson

[57] ABSTRACT

To be able, in a machine for machining workpieces and showing a spindle with spindle draw bar, to use an arm (10) with a draw bar pin (2) in a machining device for several working operations or separate tool holders (3) or different types of tools, the draw bar pin (2) is arranged in one piece with or in communication with a tool element (4) including in the arm (10). The tool element is shaped to hold tools or the tool holder (3). The draw bar pin (2) and tool element (4) plus eventual existing connecting elements (5, 12, 13) between the draw bar pin and the tool element are arranged displaceable in the arm (10), whereby the draw bar force of the machine's spindle draw bar is utilized to retain the tools or tool holder in the arm. When resetting or replacing the tools or tool holder (3) the draw bar force of the machine's spindle draw bar is made to stop, whereby the draw bar pin (2) of the arm (10) is made by a drawing element (7) shown by the arm, to displace whereby the tools or tool holder is released from an unmoveable or fixed position in the arm. When the arm (10) is to be released from the machine or its spindle for example exchanging an arm, a lock or fixing device (9) shown by the arm (10) is brought into engagement with the arm's draw bar pin (2), tool element (4), a connecting element (5, 12, 13) or another with the draw bar pin connected element and locks or fixes the draw bar pin against displacement, whereby the machine's ejector mechanism or its spindle draw bar can expel the arm.

10 Claims, 3 Drawing Sheets

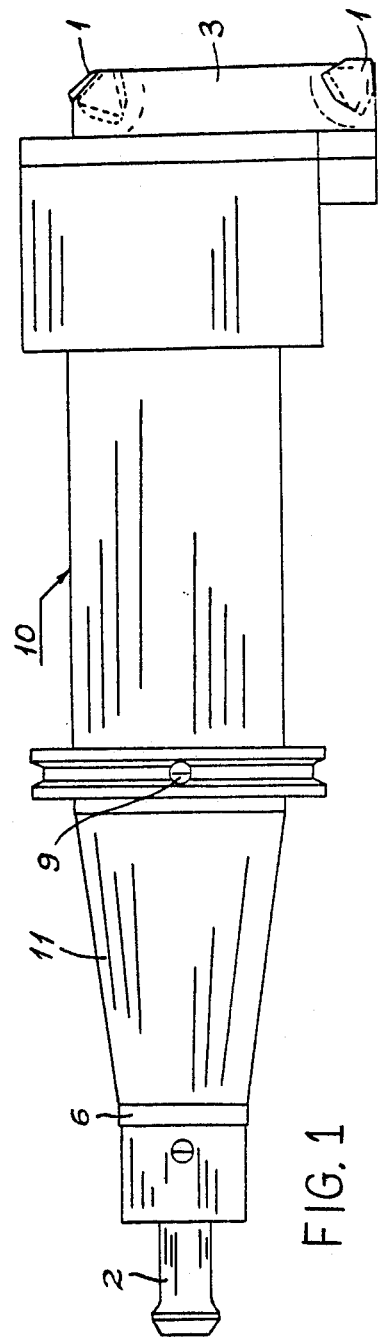
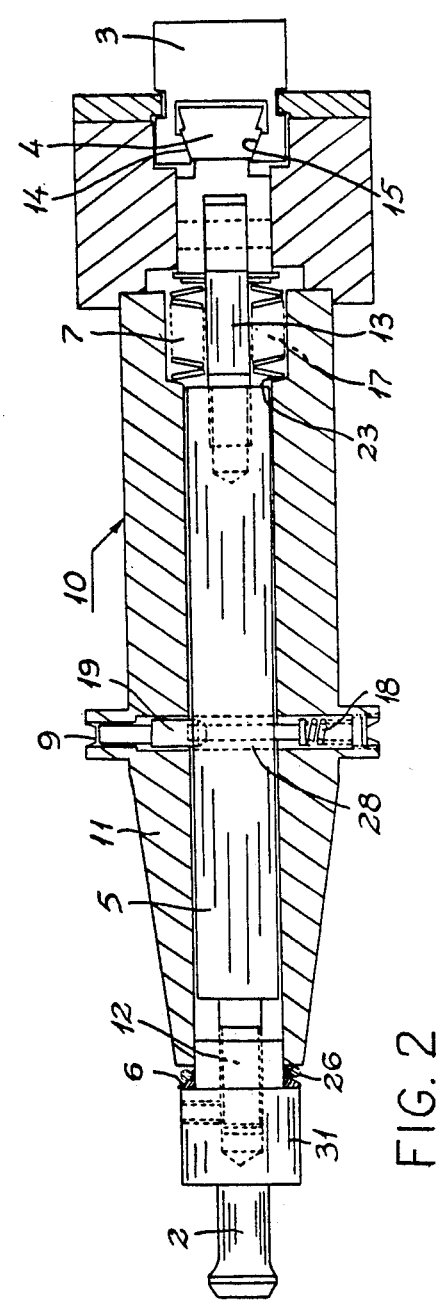
FIG. 1
FIG. 2

DEVICE FOR SECURING TOOLS IN METAL WORKING MACHINE

TECHNICAL FIELD

This invention relates to a method for machining devices, intended for machines that are of the type having a spindle, as lathes, boring machines and milling machines and such numerically controlled machines or multiple-operation machines or similar machines. The machining devices hereby comprises a bar with a draw-bar pin.

BACKGROUND

There is a need of a method for utilizing a machining device for several machining operations on a workpiece and further for using the same device for machining of the workpiece in various positions and locations. Further, there is a need for carrying out these machining operations in a simple manner with a simple device, that can be achieved at a relatively low cost.

TECHNICAL PROBLEMS

With known methods and devices a machining tool in the form of a bar can be utilized for machining of a workpiece in one position or one location, whereby further machining of the workpiece demands replacement of the bar with other bars. In order to reduce the costs for these expensive bars there are bars with two or more tools, whereby each tool can be used for machining the workpiece in one position or one location. For simplification of the work process there are even known methods and devices for automatic resetting of the machining tool, for example concerning bars for boring, but these devices are complicated and expensive to manufacture. Utilization of these known, resetable machining tools or bars also demands technologically advanced machines, such as numerically controlled multiple-operation machines, which among other things involve heavy investment costs, therefore utilization of the technique for resetable machining tools is limited and thereby to such manufacturers who are able to stand up for such heavy costs. Further, it should be pointed out that certain service, operational interruptions and repairs of such advanced machines and machining tools require the availability of specialists, who must for the most be engaged from other companies, and whose availability is limited, which in turn can cause relatively long and expensive production delays.

THE SOLUTION

The method in accordance with this invention permits however, a machining of a workpiece in a multitude of different positions and locations with only one machining device or bar which can also be arranged for an automatic resetting between the different positions and locations. Further, the method implies that the costs for the machining devices and for the production are considerably reduced, as are investment and maintenance costs, to a low level or as desired to a moderate and adapted level. Furthermore, the method is simple to use and can be adapted to the equipment and requirements existing. The method implies that the highest requirements that can be made upon machines and machining devices of the type in question can be fulfilled and the disadvantages with known methods can be eliminated, and this is achieved with a simple method at low costs in comparison with equivalent known methods. The methods in accordance with the invention is characterized in that, the draw-bar pin of the bar is arranged in communication with a tool element shown by the bar, which tool element is shaped to be able to hold tools or a tool holder for tools. Further, the draw-bar force of a spindle draw-bar shown by the machine is utilized to hold the tools or holder to the bar.

The invention also relates to a machining device, arranged for such machines having a spindle and spindle draw-bar, for example lathes, boring machines and milling machines or other workpiece cutting machines, and such numerically controlled machines or multiple-operation machines or similar, whereby the machining device comprises a bar showing a body and a draw-bar pin which is arranged to be able to be entered into engagement with the machine's spindle draw-bar. The device is characterized in that the draw-bar pin is arranged displaceable and in communication with a tool element shown by the bar which tool element is intended to hold tools or a tool holder for the tools.

BRIEF DESCRIPTION OF THE DRAWINGS

Further characteristics of, and advantages with the method and device in accordance with the invention will in the following description of the invention be apparent by an embodiment, whereby a simultaneous reference will be made to the accompanying schematic drawings, of which FIG. 1 shows a bar with tools and tool holder seen from one side, FIG. 2 shows a partial section of the bar according to FIG. 1 from another side without tools.

BEST MODE FOR CARRYING OUT THE INVENTION

Figure 4:
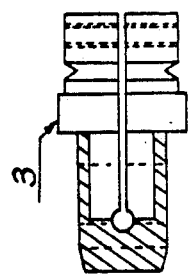
FIG. 4 shows a partial section of a tool holder for the bar according to FIG. 3 from one side.
Figure 3:
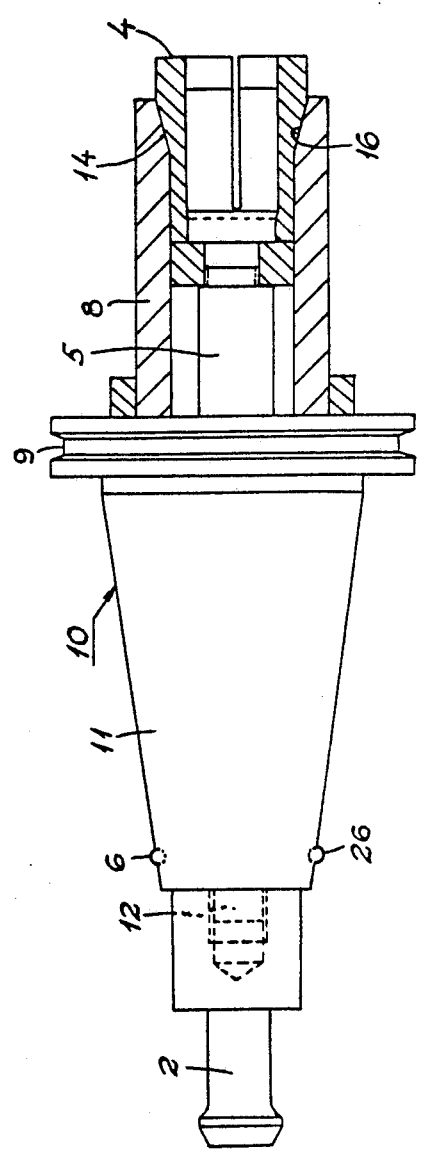
FIG. 3 shows a partial section of another bar from one side without tools and tool holder.

With reference designation 10 in FIGS. 1-3 is shown a bar 10, comprising a body 11, a draw-bar pin 2 and tool element 4, to which tools 1 or a holder 3 for the tools can be attached. The draw-bar pin 2 and the tool element 4 shall be connected to each other and be either formed in one piece with each other or connected to each other with formed parts 31, or one or several arranged elements 5, 12, 13 intended to connect the draw-bar pin 2 with tool element 4. According to the embodiment shown, in the body is arranged a draw-bar 5, which is combined with or via a first connecting element 12 is connected to the draw-bar pin 2, which protrudes from one end of the body. The other end of the body 11 is exhibited the tool element 4, which is arranged as a holder for tools 1 or tool holder 3, which according to advantageous embodiments is arranged to be displaceable in or along the tool element 4, or displaceable in tool element 4, see also FIG. 4. The bar's draw-bar 5 is further combined with or via a second connecting element 13 or equivalent in connection with the tools 1 or tool element 4. Thus the draw-bar pin 2 and tool element 4 are in communication with each other via the draw-bar 5 or draw-bar and the shown first and/or second connecting element 12 and 13 respectively, whereby the draw-bar pin 2, draw-bar 5 and tool element 4 plus any other eventual connecting elements 12, 13 are arranged displaceable in the bar 10 or in applicable cases in the body 11, and are intended to be mutually in rigid connection with each other to form a working or operative unit.

Figure 5:
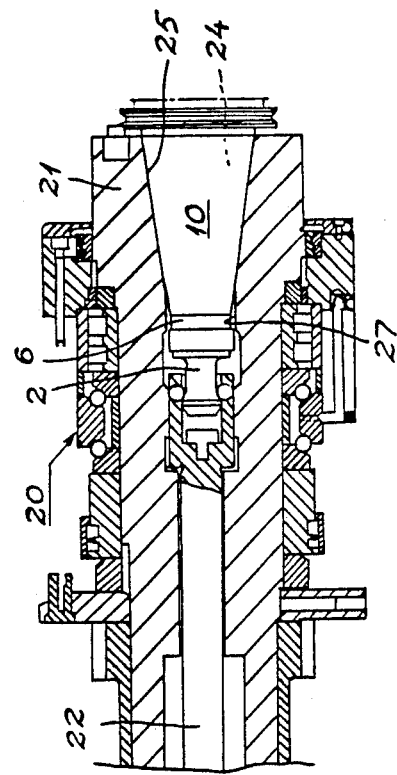
FIG. 5 shows a section through part of a machine's spindle and part of a machining device and also part of a bar arranged in a position in the machine and FIGS. 6 and 7 show a partial section of parts of a bar with parts of holding devices from one side, according to two embodiments.

Further reference to FIG. 5 shows part of a bar 10 arranged in a spindle 21 or spindle nose of a machine 20. The machine can be for example, a lathe, a milling machine, whereby the bar 10 can be a boring bar, a boring machine or other workpiece cutting machine, or a such numerically controlled machine, or a multiple-operation machine, or a similar machine. The spindle 21 has among other things a spindle draw-bar 22 and its nose has among other things an opening or space 24 with, according to the embodiment, cylindrical and conical shaped walls 25. The space 24 is designed to receive part of the bar 10. The end portion of the spindle draw-bar 22 is arranged in the usual manner to be able to be engaged with the draw-bar pin 2 of the bar, whereby the draw-bar force operating on the spindle draw-bar 22 allows the spindle draw-bar to retain the bar 10 in the machine.

In the machining device in accordance with the invention, the machine, its spindle 21 or spindle nose is arranged to receive a holding device 6. Thus the space 24 or its wall 25 is arranged with a bearing part 27 for an expansion element 26 shown by the holding device 6, the bearing part is in the form of recesses, a groove, bearing or engaging surfaces or equivalent, for example a cylindrically or a conically shaped surface.

For the displacement of the bar's draw-bar 5 and thereby simultaneous displacement of draw-bar pin 2 and tool element 4 and in applicable cases connecting elements 12, 13 the machining device or bar 10 has a drawing element 7. The drawing element 7 can be in the form of one or several elastic elements 17, for example one or several spiral springs, plate springs or packets of such elements, rubber sleeves or similar, which according to an embodiment are arranged around the draw-bar 5 of the bar, see for example FIG. 2. Hereby a drawing element 7 is in the form of a spiral spring 17 arranged between the body 11 or a shoulder 23 shown by the body, contact surface, projection or similar and draw-bar 5 or more precisely the connecting element 13 or the tool element 4 combined with the connecting element. According to a particular embodiment the drawing element 7 is formed and arranged in such a manner that it always influences upon the draw-bar pin and those elements connected to the draw-bar pin with a drawing force in one direction and in that connection work for a displacement of the draw-bar pin, etc. in an axial direction from the machine 20 or its spindle 21 or spindle draw-bar 22, when the draw-bar force of the spindle draw-bar 22 acts upon the spindle draw-bar, whereby the spindle draw-bar 22 clasps the draw-bar pin 2 of the bar 10, the draw-bar pin, etc. is held in a displaced position against the effect of the spring force in the bar's drawing element 7. This position of the draw-bar pin, etc. can among other things be seen in FIG. 2 as also the engagement of the spindle draw-bar 22 with the bar's draw-bar pin 2 in said position for the bar's draw-bar 5 in FIG. 5. Hereby the tool 1 or holder 3 which is to be carried by the bar 10 is secured to the bar in a fixed or unmoveable position. Thus, the drawing element 7 is also designed in such a manner that the draw-bar force of the spindle draw-bar exceeds by far the drawing force of the drawing element and the draw-bar force can with ease overcome the elasticity or spring force of the spring element. When the draw-bar force of the spindle draw-bar 22 is stopped the draw-bar pin 2, draw-bar 5, etc. are displaced by means of the drawing element 7 which is so arranged that it can displace the bar's draw-bar 5, draw-bar pin 2 and tool element 4 and any eventual connecting elements 12, 13. The displacement of the draw-bar pin 2, etc. is however little or so short that the tools 1 or holder 3 can be released from, adjusted, displaced, etc. in the tool element 4 and the bar 10 is prevented from being expelled from the machine's ejector mechanism, which in this case should be synonymous with the spindle draw-bar 22, which hereby would be displaced and strike the end of the bar's draw-bar pin 2, when the draw-bar force ceases to act upon the spindle draw-bar, for the purpose of releasing and expelling the bar 10 for for example replacement or changing of bar.

Thus utilizes, with the method and the device in accordance with the invention, the draw-bar force in the spindle draw-bar 22 for securing or fixing the tools 1 or holder 3 in a desired position with the bar 10 and thereby with large force. This also implies that the machining device in accordance with the invention can be formed in such a manner that it, or the tools 1, or the tool holders 3 that shall be carried by the bar 10 are not only exchangeable but can in a simple and quick manner be exchanged for other tools 1 or holders 3 with tools or be adjusted or reset in the bar to other positions or locations, whereby one can obtain that one and the same bar 10 can be utilized for either different types of machining of a workpiece or for machining of a workpiece in a relatively extensive area of machining, i.e. in a multitude of different positions and locations, whereby such miscellaneous machining via one and the same bar can be arranged for automatic operation. The basis for this is that the draw-bar force of the spindle draw-bar 22 is transmitted to the tools 1 or holder 3 for retaining the tools or holder whilst at the same time the situation achieved is utilized, as one permits the draw-bar force to step in the spindle draw-bar 22 and also designs the bar 10 and tools 1 or holder 3 so that they can be replaced and reset in the bar 10.

When the draw-bar force of the spindle draw-bar 22 in the machine 20 ceases to influence upon the draw-bar pin 2, draw-bar, etc. or when the spindle draw-bar 22 ceases with its engagement with the bar's draw-bar pin 2 of the bar so can the tools 1 or holder 3, according to the example shown in FIGS. 1 and 2, be displaced in or along the tool element 4 for resetting, adjustment or similar, or for replacement or changing. In the example shown in FIGS. 3 and 4 the tools 1 or holder 3 are arranged insertable in the tool element 4 this mainly to permit changing and replacement to other tools or holders. Hereby the tool elements 4 are formed with key shaped or inclined surfaces 14 angularly positioned to each other, see particularly the embodiment according to for example FIG. 2, or with conically shaped surfaces 14, see particularly the embodiment according to for example FIG. 3, or the equivalent which surfaces 14 are arranged to be able to be entered to an attachment for the tools 1 or holder 3 and therewith an attachment in contact with complementary conical surfaces 16 shown by the bar 10, such as would apply for the embodiment shown in FIG. 3, or an attachment in contact with complementary key shaped or angular surfaces 15, such as would apply for the embodiment shown in FIG. 2, or similar.

Figure 6:
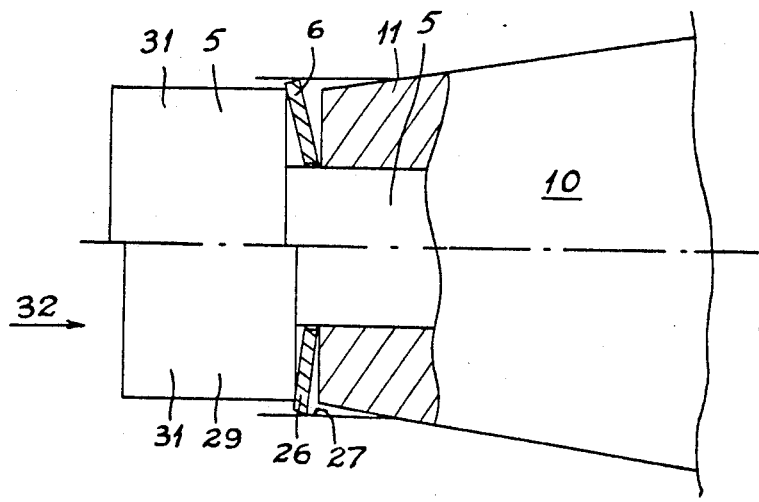

In order to ensure that the bar 10 releases or falls out from the machine or its spindle 21, when the draw-bar force of the spindle draw-bar 22 ceases so can the machining device in accordance with the invention be provided with the previously mentioned holding device 6. The holding device 6 has hereby one or several expansion elements 26, which are arranged on that part of the bar 10 that shall be connected to the spindle 21 of the machine 20, and arranged to expand or be entered into contact with the spindle of the machine, a carrier shown by the spindle, or the wall 25 shown by the spindle or the bearing part 27. The expansion element 26 can be made of metal or an elastic material such as rubber and can be in the form of a ring, as shown in the examples in FIGS. 6 and 7. The expansion element 26 or ring is hereby arranged around the bar's draw-bar 5, draw-bar pin 2 or a connecting element 12 between the draw-bar and the draw-bar pin and is brought by the movement of the draw-bar 5 or similar, to expand, enter, press or similar, against the bearing part 27 of the spindle 21. Thus, in FIG. 6 is shown an expansion element 26, that is arranged between the body 11 and the bar's draw-bar 5, the first connecting element 12 or a holding body 31, which connects the draw-bar pin 2 with the bar's draw-bar 5 or the connecting element 12. With reference designation 35 is shown the bar's draw-bar 5 or similar or the holding body 31 in a position, in which the spindle draw-bar 22 of spindle 21 grasps the draw-bar pin 2 and the draw-bar force of the spindle draw-bar 22 acts on the bar's draw-bar 5 or equivalent. Hereby, the expansion element 26 is not expanded for an engagement or likewise with the wall 25 or the bearing part 27 in the space 24 of the spindle nose. As stated previously and according to the embodiment, the bar's draw-bar 5 is displaced or drawn by the drawing element 7 in a direction from the spindle 21 of the machine 20, see arrow 32, when the draw-bar force of the spindle draw-bar ceases to act, whereby the bar's draw-bar 5 or equivalent or the holding body 31 takes up the position indicated by reference designation 29 and expansion element 26 expands for engagement, expansion, pressing, connection or similar against said bearing part 27 and thereby in such a manner that the bar 10 is retained in the machine 20 or in its spindle 21.

Figure 7:
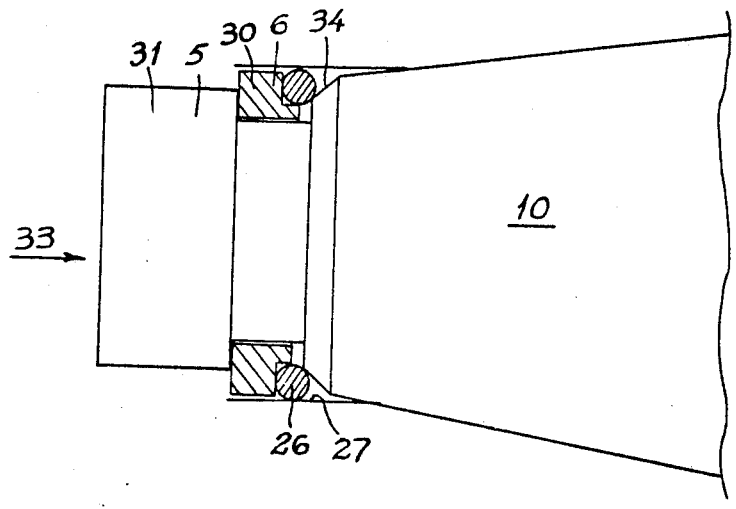

In FIG. 7 is shown a holding device 6 equivalent to that in FIG. 6 but according to a second suggested embodiment. Thus, expansion element 26 is in the form of for example a rubber ring arranged between the body 11 and a seating 30 or seating ring attached to the bar's draw-bar 5, to the first connecting element 12 and/or a holding body 31, which in similarity with the previously described embodiment connects the draw-bar pin 2 with the bar's draw-bar 5 or the connecting element 12. In the position shown in the figure, the expansion element 26 is not expanded against the bearing part 27 or similar. As previously stated and according to the embodiment, the bar's draw-bar 5 is displaced or drawn by the drawing element 7 in a direction from the spindle 21 of the machine 20 when the draw-bar force of the draw-bar spindle 22 stops, i.e. in the direction indicated by the arrow 33, whereby the expansion element 26 is made to expand against the bearing part 27 or equivalent and thereby in such a manner that the bar 10 is retained in the machine 20 or in its spindle 21. Thus, the expansion element 26 is made to move towards a designed expansion surface 34 and is pressed between the expansion surface 34, seating 30 and bearing part 27.

In applicable cases the device can show a lock or fixing device 9 in order to ensure that the tools 1 or holder 3 do not loosen or fall out from the machining device or bar 10, when the bar 10 is to be removed from the machine 20 or its spindle 21 when for example changing, replacing or storing the machining tool or bar, whereby the draw-bar force of the spindle draw-bar 22 stops and the spindle draw-bar disengages from the bar's draw-bar pin 2. The lock or fixing device 9 is hereby arranged to obstruct a displacement of the draw-bar pin 2, draw-bar 5 and said draw-bar connected elements, whereby the attached and fixed position of the tool 1 or holder 3 relative to the bar 10 is maintained whilst at the same time the holding device 6 cannot be activated. Hereby, the bar 10 can be removed from the machine or its spindle 21 or will be expelled by the machine's 20 ejector mechanism, i.e. according to the example, its spindle draw-bar 22.

With further reference to FIG. 2 is shown a locking and fixing device 9 that can be in the form of a moveable or displaceable piston 19, journal, pin or similar arranged in the bar 10 or body 11, which according to the example is arranged to be able to be entered into engagement with the bar's draw-bar 5 or with a hole 28 or recess shown by the draw-bar 5, and thereby lock or fix the draw-bar pin, draw-bar, etc. against displacement in relation to the body 11 or in one direction from the machine 20, its spindle 21 or spindle draw-bar 22. According to the example the piston 19 is entered into engagement with the bar's draw-bar 5 against the effect of a spring 18 or similar, which can thus be arranged to reach through said hole 28 in the draw-bar 5. To lock or fix the draw-bar pin, draw-bar, etc. against displacement in the bar 10 or body 11, the piston 19 or similar can be arranged to engage with another element shown by the bar and connected to the draw-bar 5. An example of such an element can be the draw-bar pin 2, tool element 4, the first or second connecting element 12 or 13 or the holding body 31. The control of the piston 19 or similar for locking the draw-bar 5 of the bar 10 against displacement and to release the draw-bar from the locked and fixed position can be carried out manually by a machine operator or somebody else or if appropriate by means of the machines tool exchanger in the case of multiple-operation machines.

Without exceeding the scope of the concept of the invention, modifications to the method and the device should be possible. Thus, the fixing and locking device can be in the form of some other type of device, as also the holding device even if those embodiments shown in the examples are simple and reliable. The spindle nose aperture can be in the form of a contacting part with a groove or other type of engaging surface. The machining device in the form of the bar, as well as the tools and holders can be adjusted, reset, changed and replaced automatically or manually and thereby to various hole diameters, etc. for machining, as also the activation of the holding device. This can be controlled through the machine's NC system when applying the invention to such a machine, whereby one utilizes the existing properties of the NC machine. With automatically operating devices the positioning of the bar is achieved via the machine's tool exchanger or tool exchanger arm. The holding device can be made partly of rubber as stated or of a rubber-elastic material or of a plastic material. The displacement when locking or releasing the tool in the tool holder can be a few millimeters, for example between 1 mm and up to 2 mm or some more. The method and the device are thus not restricted to that shown and described with regard to the embodiment, but soley by the following claims.

We claim:

1. A machining device arranged for a machine (20) having a spindle (21) and a spindle draw-bar (22), comprising:
   a bar (10) including a body (11) and a displaceable draw-bar pin (2) formed to enter into engagement with the spindle draw-bar (22), and in communication with a tool element (4) of the bar (10), the tool element being formed to hold a tool whereby the draw-bar force of the spindle draw-bar can be utilized to hold the tool to the bar, said bar (10) further including a fixing device (9) arranged to fix selectively the tool element (4) against displacement in relation to the body (11) in an axial direction from the machine (20).

2. A machining device arranged for a machine (20) having a spindle (21) and a spindle draw-bar (22), comprising:
   a bar (10) including a body (11) and a displaceable draw-bar pin (2) formed to enter into engagement with the spindle draw-bar (22), and in communication with a tool element (4) of the bar (10), the tool element being formed to hold a tool whereby the draw-bar force of the spindle draw-bar can be utilized to hold the tool to the bar, and a fixing device (9) which is an engaging device arranged in the body (11), said fixing device (9) including a piston (19) formed to enter selectively into engagement with the tool element (4) against the effect of a spring (18).

3. A machining device arranged for a machine (20) having a spindle (21) and a spindle draw-bar (22), comprising:
   a bar (10) including a body (11) and a displaceable draw-bar pin (2) formed to enter into engagement with the spindle draw-bar (22), and in communication with a tool element (4) of the bar (10), the tool element being formed to hold a tool whereby the draw-bar force of the spindle draw-bar can be utilized to hold the tool to the bar, and at least one expansion element (26) arranged to expand into contact with the spindle (21) of the machine (20).

4. An adapter for securing a tool on a machine of the type having a spindle and spindle draw-bar axially extending therethrough, comprising:
   shank means formed at one end to fit into the outer end of the spindle along the axis of the spindle draw-bar;
   draw-bar means slidable within said shank means along said axis and having one end formed for releasable engagement by the outer end of the spindle draw-bar and having the other end of said draw-bar means and the outer end of said shank means formed for receiving therebetween the tool in the operative position, said drawbar means further including an elongated member slidable within said shank means, a pin formed at one end of said member and protruding from said one end of said shank means for releasable engagement by the spindle draw-bar, and holding means positioned between said member and said pin for locking said shank means within the spindle when said pin is released by the spindle draw-bar; and
   force exerting means operatively connected between said shank means and said draw-bar means for applying an insertion force to said shank means when said draw-bar means is operatively engaged to the spindle draw-bar.

5. An adapter according to claim 4, wherein:
   said other end of said draw-bar means includes inclined surfaces complementary to a key-shaped recess in the tool.

6. An adapter according to claim 4, wherein:
   said other end of said draw-bar means includes a conical surface complementary to a conical recess in the insertable end of the tool.

7. An adapter according to claim 4, wherein:
   said force exerting means includes an elastic element compressible between said shank means and said draw-bar means.

8. An adapter according to claim 4, further comprising:
   locking means operatively connected to said shank means and said member for selectably preventing axial displacement of said draw-bar means thereby disabling said holding means when said pin is released by the spindle draw-bar.

9. An adapter according to claim 8, wherein:
   said locking means includes a key transversely slidable through said member, said key being coextensive with the width of said member, elastic means within said shank means for urging said key into said member, and an element within said shank for urging said key out of said member thereby allowing axial displacement of the draw-bar means.

10. An adapter according to claim 4, wherein:
    said holding means includes an elastic element formed to expand against the spindle by compression between said pin and said shank when said pin is released thereby preventing said shank means from releasing from the spindle.

* * * * *